D. McF. MOORE.
MECHANICAL JOINT FOR VACUUM TUBES.
APPLICATION FILED APR. 16, 1908.

1,063,996.

Patented June 10, 1913.
2 SHEETS—SHEET 1.

WITNESSES:

INVENTOR
Daniel McFarlan Moore
BY
ATTORNEYS

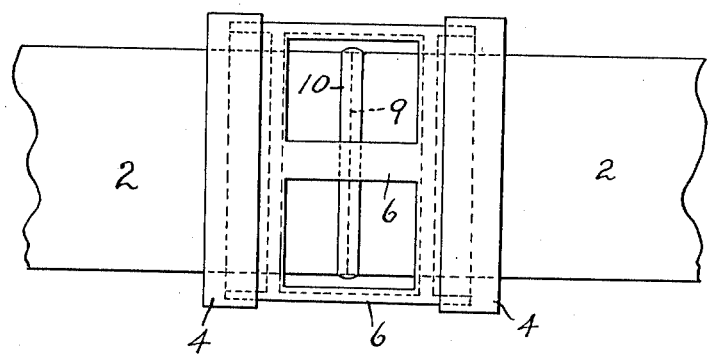
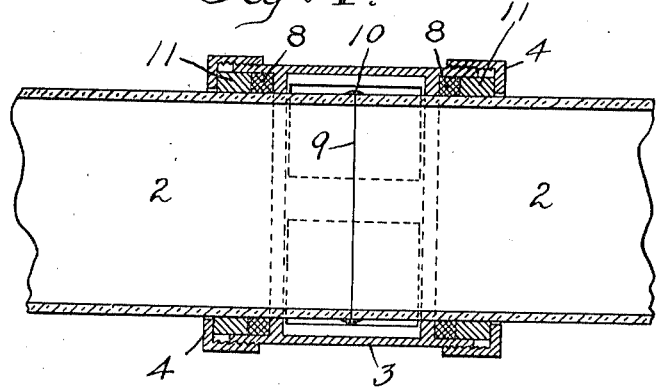

UNITED STATES PATENT OFFICE.

DANIEL McFARLAN MOORE, OF NEWARK, NEW JERSEY, ASSIGNOR TO GENERAL ELECTRIC COMPANY, A CORPORATION OF NEW YORK.

MECHANICAL JOINT FOR VACUUM-TUBES.

1,063,996.

Specification of Letters Patent. Patented June 10, 1913.

Application filed April 16, 1908. Serial No. 427,366.

*To all whom it may concern:*

Be it known that I, DANIEL McFARLAN MOORE, a citizen of the United States, and a resident of Newark, in the county of Essex and State of New Jersey, have invented certain new and useful Improvements in Mechanical Joints for Vacuum-Tubes, of which the following is a specification.

My invention relates to means for forming an air-tight joint between sections of tubing, and is especially designed for use in forming a joint between coupled sections of glass tubing joined up to form the tube of a vacuum tube lighting system.

The objects of my invention are to provide a simple and effective device whereby the tubes or tube sections may be assembled and fastened together in proper alinement and especially to provide a coupling of such nature that, after the assembling of the tube section, a sealing paint, paste or cement may be applied to the portions of the joint within the coupling in order to produce an effective air-tight seal.

The invention consists in the special devices and combinations of devices hereinafter more particularly described and then specified in the claims.

Figure 1:
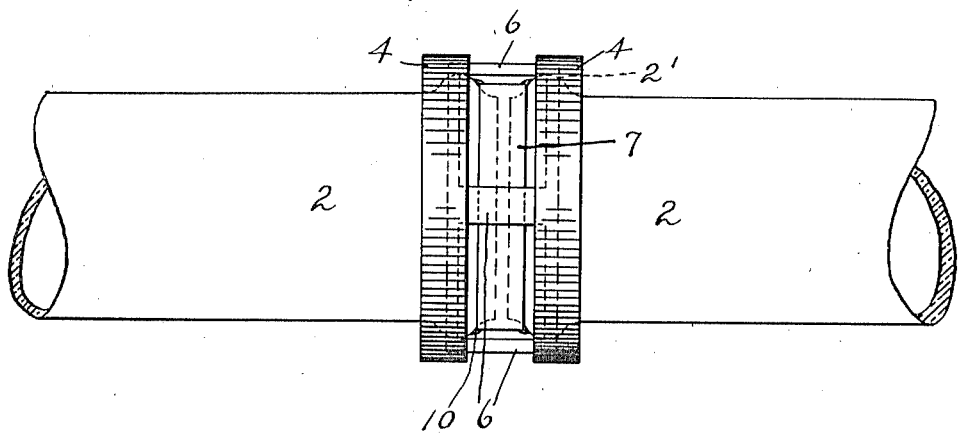
Figure 2:
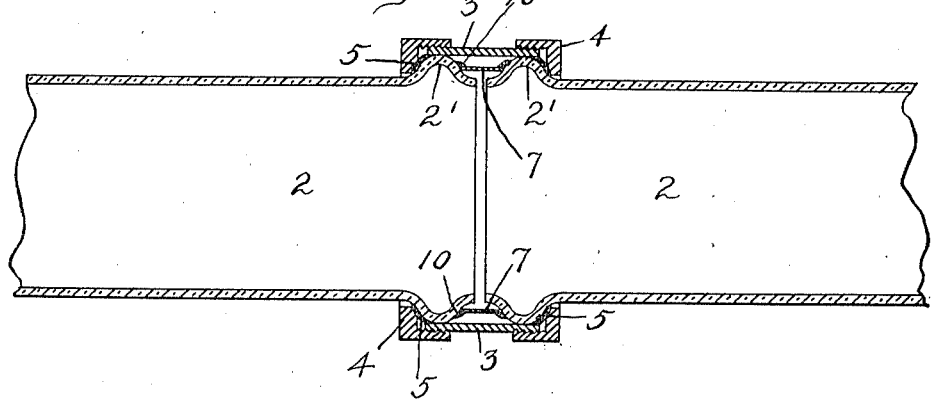

In the accompanying drawings, Figure 1 shows the end portions of two sections of tube joined in a coupling constructed in accordance with my invention. Fig. 2 is a horizontal vertical section through Fig. 1 and illustrates more clearly the means that may be employed for forming the seal between the abutting or juxtaposed ends of the tube section. Fig. 3 is an elevation of a modification of my invention. Fig. 4 is a longitudinal section through the same.

Referring to Fig. 1, two sections of glass tubing are indicated at 2. Near their ends, these sections are provided with a circumferential shoulder as indicated at 2', which shoulder may consist of a circumferential enlargement of the tube made by spinning or forming the glass while plastic in any desired way known to workers in glass and other material.

3 is the frame or body of the coupler which sustains and holds the tubes at their juxtaposed ends and which said frame also carries proper compression devices whereby the ends of the tubes may be forced toward one another to form a joint which shall be as nearly air-tight as possible without the use of any sealing paste, paint or cement, or other material applied after the coupling of the tubes together and the substantial completion of the joint.

The devices for forcing the tubes together may comprise the compression nuts 4 which engage the circumference of the coupler at its opposite ends by screw threads and engage the rear side of the shoulders 2' by internal flanges, as shown more clearly in Fig. 2, so that on screwing up the nuts, the tube sections are drawn together. The compression nuts 4 may be placed on the tubes 2 in any suitable manner, as for instance by threading the ends of the tubes remote from the shoulders 2' through the opening in the nuts 4 or by applying the nut 4 to the tube 2 prior to forming the shoulder 2'.

Interposed between the nuts and the glass shoulders are bushings or washers 5 designed to save the glass from injury by the impingement of the hard metal of the nuts upon the glass.

The coupler frame or body 3 is of skeleton construction and comprises essentially, the two ring portions engaged, respectively, by the nuts and the cross bars or rods 6, as few in number and as narrow as is consistent with due strength and rigidity so as to leave as much free space as possible giving access to the parts of the joint within the coupling.

The joint itself between the juxtaposed ends of the tubes may be formed in any desired way, but for simplicity, I employ a sealing ring or sleeve 7 which is engaged by and held between the shoulders, as shown more clearly in Fig. 2, when the tubes are drawn together. This sleeve or ring 7 may be made of any desired material, but it is entirely feasible to employ metal for the purpose or some material which is substantially non-compressible under the conditions of use described, although it would be within my invention to use a material more or less compressible and, therefore adapted to swell, expand or squeeze out where it is engaged by the shoulders and to thereby make a better seal at the point of engagement. The sealing ring or sleeve 7, preferably, engages, by its edges, upon an incline on the shoulder at 2', so that the sealing effect by drawing the tube sections together, is enhanced by the wedging action of the incline, which is expended in tendency to expand the metal ring. If a rather thin piece of hard metal is employed, the biting effect of the metal upon the glass, especially if the glass is ground or roughened, at the point of engagement, will assist in producing a good seal. After the tubes have been assembled and coupled with the metal or other sealing ring in place between them and they have been drawn together by the compression devices, so as to get as good a seal as possible, such seal may be perfected by the application of any suitable sealing material applied to the surfaces or lines of the joint by means of a brush or other device introduced through the skeleton coupler.

In the modification of my invention illustrated in Figs. 3 and 4, the joint between the sections of tubing is a ground butt joint and said tubes do not have the circumferential shoulder already described. In this form of my invention, I provide within the skeleton coupler two rings or washers 8 of some elastic or compressible and expansible substance upon which the nuts 4 or other compression devices may act to expand said rings inwardly and cause them to firmly grasp the surface of the tubes, further action or movement of the compression devices then resulting in communicating a longitudinal movement or pressure to the tube sections, thereby drawing their ground ends into close contact with one another on the line 9. After this has been done, a paint, paste, cement or other sealing material, indicated at 10, may be applied to the joint through the openings in the skeleton frame or coupler. If desired a metal follower 11 may be interposed between each nut and the compressible ring or washer 8 upon which it acts.

In Fig. 2 the sealing material applied through the openings in the skeleton frame is indicated at 10.

What I claim as my invention is:—

1. In a joint for glass tubing, the combination of circumferentially shouldered tube sections, a skeleton coupler adapted to receive and support the ends of the tubes in alinement and compression devices carried by said coupler and adapted to force the tube sections toward one another.

2. In a joint for glass tubing, the combination of circumferentially shouldered tube sections, a skeleton coupler adapted to receive and support the ends of the tubes in alinement and compression nuts carried by said coupler and adapted to force the tube sections toward one another.

3. In a joint or coupling for glass tubing, the combination of circumferentially shouldered tube sections, a skeleton coupler adapted to receive the ends of the tube sections, a sealing ring engaged at its edges by said sections, and means for forcing said sections against the rings.

4. In a joint or coupling for glass tubing, the combination of circumferentially shouldered tube sections, a skeleton coupler adapted to receive the ends of the tube sections, a sealing ring engaged at its edges by said sections, and compression nuts carried by the skeleton coupler and engaging the shoulders.

5. In a joint or coupling for glass tubing, the combination of circumferentially shouldered tube sections, a skeleton coupler adapted to receive the ends of the tube sections, a sealing ring engaged at its edges by said shoulders, and compression nuts carried by the skeleton coupler and engaging the shoulders.

6. In a joint and coupler for glass tubing, the combination of shouldered tube sections, an interposed sealing ring engaged at its edge by inclines on said shoulders, a skeleton coupling frame receiving said shouldered ends and compression devices mounted on said frame.

7. In a joint and coupler for glass tubing, the combination of shouldered tube sections, an interposed sealing ring engaged at its edge by inclines on said shoulders, a skeleton coupling frame receiving said shouldered ends and compression nuts mounted on the frame and engaging said shoulders.

Signed at New York in the county of New York and State of New York this 14th day of April A. D. 1908.

DANIEL McFARLAN MOORE.

Witnesses:
C. F. TISCHNER, Jr.,
LILLIAN BLOND.